Oct. 31, 1967 E. A. ARON 3,350,700

TRACK SELECTION LOGIC FOR MAGNETIC STORAGE DRUM

Filed Dec. 16, 1964 2 Sheets-Sheet 1

INVENTOR
E. A. ARON

BY

ATTORNEY
James S. Shannon
AGENT

INVENTOR
E. A. ARON
BY Harry A. Herbert Jr.
ATTORNEY
James S. Shannon
AGENT 3,350,700

TRACK SELECTION LOGIC FOR MAGNETIC STORAGE DRUM

Edward A. Aron, Needham, Mass., assignor to the United States of America as represented by the Secretary of the Air Force Filed Dec. 16, 1964, Ser. No. 418,935
1 Claim. (Cl. 340—174.1)

The purpose of this invention is to provide a track selection circuit for magnetic information storage drums that is simpler and requires significantly fewer circuit components than selection circuits heretofore used.

Customarily, a decoder having a separate output for each head on the drum has been used to energize the head called for by the track selection binary code. In accordance with the invention, the heads are divided into equal groups of several units each. The required number of bits from the track selection code are then used to select one of the groups and the remaining bits are used to select one head in the selected group. This logic results in a substantial simplification of the track selection circuit and a substantial reduction in the number of circuit components such as AND gates and head switches that are required.

A more detailed description of the invention will be given with reference to the specific embodiment thereof shown in the accompanying drawing in which.

Figure 1:
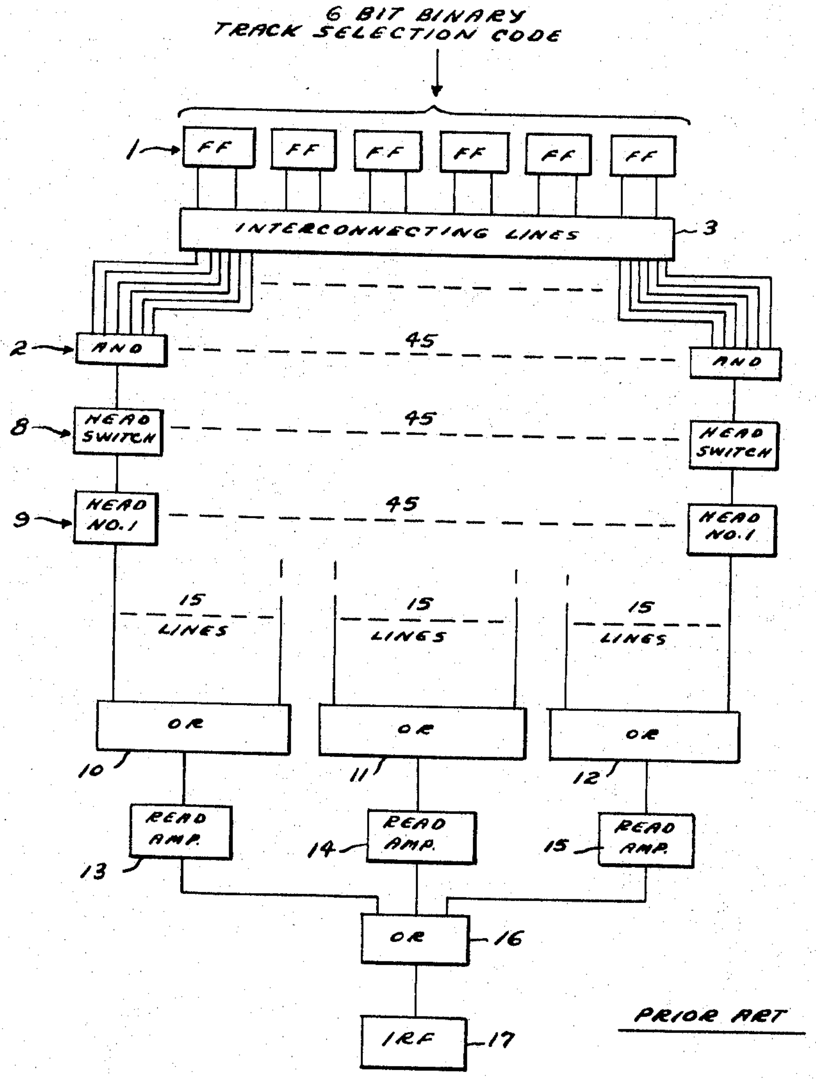
FIG. 1 is a formerly used track selection circuit.

Referring to FIG. 1, there is shown in this figure a formerly used circuit for selecting a desired one of forty-five read heads, corresponding to forty-five tracks on a magnetic drum, as called for by a six bit binary code. The number of heads is immaterial, forty-five being indicated merely by way of example, and the number of bits in the binary code is of course determined by the number of heads from which the selection is to be made. Computer instructions in the form of binary words may be recorded on the drum tracks.

The decoder for the track selection code comprises a register in the form of six bistable or flip-flop circuits 1, forty-five six-input AND gates 2, and interconnecting lines between the AND gate inputs and the register which are represented by rectangle 3 since it would be impractical to show all of these connections in the drawing. Decoders of this type are well known in the art and a simple one, with all interconnections shown, is illustrated as part of FIG. 2.

Figure 2:
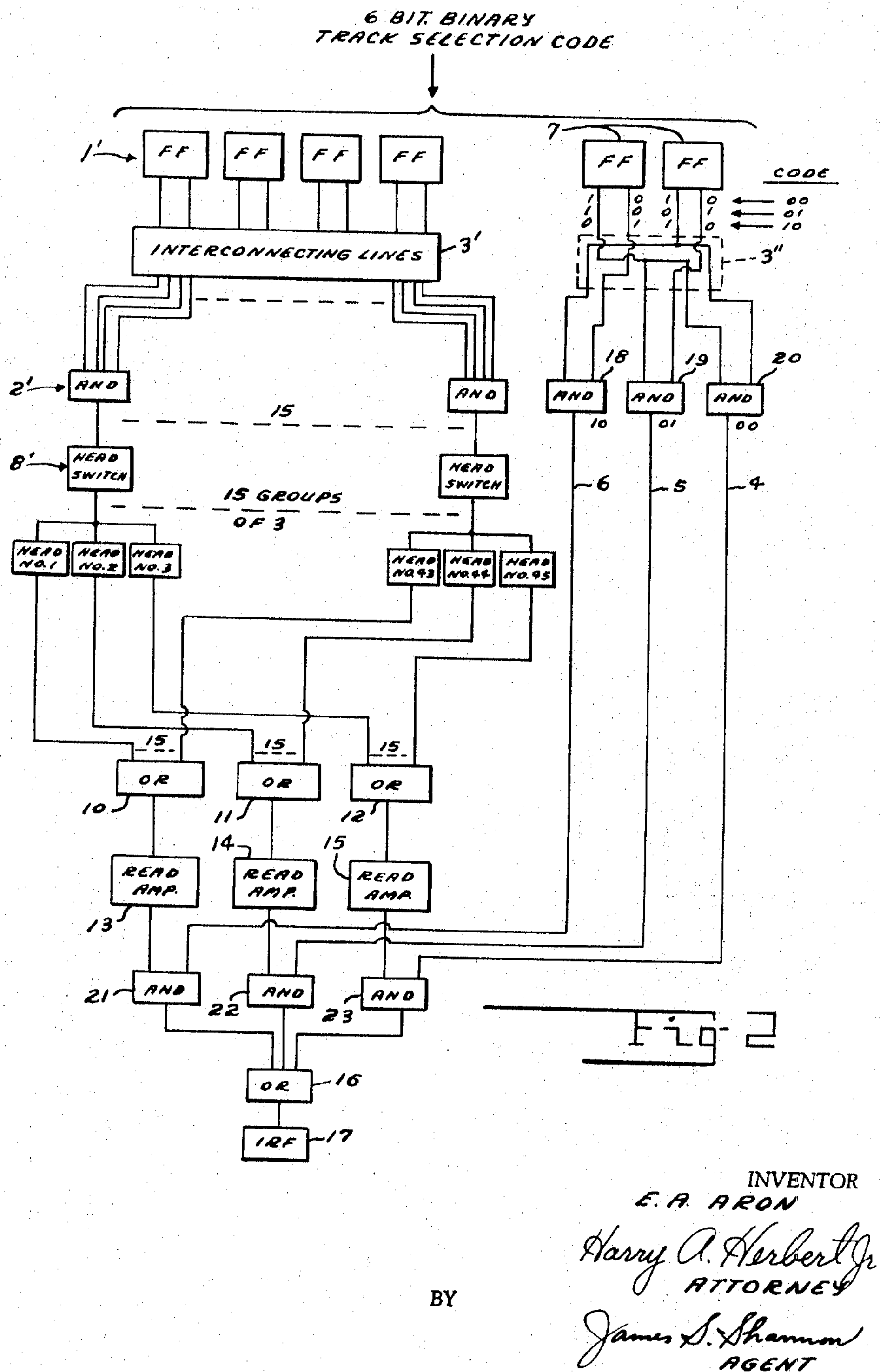
FIG. 2 is a simplification of the circuit of FIG. 1 in accordance with the invention.

Referring momentarily to FIG. 2, a decoder is shown for selecting one of the three output lines 4, 5 and 6 in accordance with the two bit binary code in the register composed of the two flipflops 7. The AND gates produce an output only when a 1 occurs on both inputs. The conditions of the flipflops are indicated for three of the four possible codes. The illustrated circuit is otherwise self-explanatory.

Returning to FIG. 1, the output of each of the forty-five AND gates 2 is applied to one of the forty-five head switches 8 each one of which controls one of the forty-five heads 9. The purpose of each head switch is to place its associated head in an operative state for reading the digital information magnetically recorded on the drum track located beneath the particular head. The output circuit of each of the heads 9 is connected through one of the OR gates 10, 11 and 12, one of the read amplifiers 13, 14 and 15, and through OR gate 16 to the instruction read flipflop (IRF) 17 which reproduces the serial binary code recorded on the drum track selected.

FIG. 2 shows a track selection circuit constructed in accordance with the invention. As in FIG. 1, the illustrated circuit is for forty-five tracks although the principles involved may be applied to any number. In this arrangement the heads are divided into fifteen groups of three heads each. A head switch is provided for each group and serves to render all heads in the group operative simultaneously. The track selection code is divided into two parts with one part being used to select one of the fifteen groups and the other part being used to select one of the three heads in a group.

Four bits of the track selection code are required to select any one of the fifteen groups of heads. The decoder for this portion of the code consists of the register constituted by the four flipflops 1′, the fifteen AND gates 2′ and the interconnecting lines 3′. This decoder is similar to that shown in FIG. 1 and operates to actuate one of the fifteen head switches 8′ as called for by the designated four bits of the track selection code. Actuation of any one of the head switches renders each of the three heads in the associated group operative to read information from the three drum tracks beneath the heads.

Each of the OR gates 10, 11 and 12 receives the output from one head in each of the fifteen groups. Consequently, regardless of the head group selected, an output occurs from each of the OR gates and, therefore, from each of the read amplifiers 13, 14 and 15.

The remaining two bits of the track selection code are used to select one of the outputs from the three read amplifiers. The decoder in this case consists of the register constituted by the two flipflops 7, the AND gates 18, 19 and 20, and the interconnecting lines 3″. Depending upon the code, one of the decoder output lines 4, 5 and 6 is energized permitting the output of one of the read amplifiers 13, 14 or 15 to pass through its associated AND gate 21, 22 or 23 and through OR gate 16 to the IRF 17. The IRF is in effect a wave shaping device for the recorded digital information from which this information may be supplied to a utilization circuit. In an obvious modification, AND gates 18, 19 and 20 could be eliminated and their inputs applied as inputs to AND gates 21, 22 and 23, making these three-input AND gates.

The savings in components resulting from the use of the arrangement of FIG. 2 rather than that of FIG. 1 are apparent. FIG. 1 requires forty-five AND circuits whereas FIG. 2 requires only twenty-one (or eighteen if gates 18, 19 and 20 are eliminated as stated above), and, in FIG. 1, forty-five head switches are required whereas FIG. 2 requires only fifteen.

As stated above, the number of tracks and associated heads shown in FIGS. 1 and 2 is merely by way of example, the principle being applicable to any relatively large number of tracks. In the general case, the heads are divided into M groups of N heads each. Then, $2^{n'} \geqq M$ and $2^{n''} \geqq N$, where $n'$ is the number of bits in the binary track selection code required to select the desired group and $n''$ is the number of bits required to select the desired head within the selected group. Normally the smallest values of $n'$ and $n''$ satisfying the above relationships would be used.

I claim:

A track selection circuit for a multiple track magnetic storage drum having a separate head for each track, said heads being divisible into M groups of N heads each, said circuit being responsive to a binary track selection code of $n'+n''$ bits to select one of the drum tracks for readout of its recorded information, said circuit comprising: M head switches in a one-to-one correspondence with said M head groups, each head switch being connected to all of the N heads in its corresponding group and acting when actuated to render these heads simultaneously operative to read out the information recorded on their associated tracks; a decoder having M outputs coupled to said M head switches for receiving the $n'$ bits of said code, where $2^{n'} \geqq M$, and for activating one of said head switches as called for by the $n'$ portion of said code; N OR gates, each corresponding to one of the N heads in each of the M head groups; and means for applying the output of each head in each head group as an input to its corresponding OR gate; N AND gates corresponding to said N OR gates; means for applying the output of each OR gate as an input to its corresponding AND gate; a decoder having outputs coupled as inputs to each of said AND gates for receiving the $n''$ bits of said code, where $2^{n''} \geqq N$, and for conditioning one only of said AND gates to pass a signal as called for by the $n''$ portion of said code; and means including an additional OR gate for coupling the outputs of said AND gates to a recorded information utilization circuit.

References Cited

UNITED STATES PATENTS

| | | | |
|---|---|---|---|
| 3,156,906 | 11/1964 | Cummins | 340—174.1 |
| 3,158,844 | 11/1964 | Bowdle | 340—174.1 |

BERNARD KONICK, *Primary Examiner.*

A. I. NEUSTADT, *Assistant Examiner.*